United States Patent [19]

Tuckey

[11] Patent Number: 5,398,655
[45] Date of Patent: Mar. 21, 1995

[54] MANIFOLD REFERENCED RETURNLESS FUEL SYSTEM

[75] Inventor: Charles H. Tuckey, Cass City, Mich.

[73] Assignee: Walbro Corporation, Cass City, Mich.

[21] Appl. No.: 262,847

[22] Filed: Jun. 21, 1994

Related U.S. Application Data

[63] Continuation-in-part of Ser. No. 181,848, Jan. 14, 1994.

[51] Int. Cl.⁶ ............................................. F02M 37/04
[52] U.S. Cl. ..................................... 123/456; 123/514; 123/497
[58] Field of Search ................ 123/497, 514, 509, 456, 123/467, 463; 137/510, 563, 569

[56] References Cited

U.S. PATENT DOCUMENTS

| | | | |
|---|---|---|---|
| 3,913,547 | 10/1975 | Wentworth | 123/497 |
| 3,967,598 | 7/1976 | Racher | 123/497 |
| 4,437,443 | 3/1984 | Hofbauer | 123/467 |
| 4,728,264 | 3/1988 | Tuckey | 417/44 |
| 4,800,859 | 1/1989 | Sagisaka | 123/497 |
| 4,825,835 | 5/1989 | Deweerdt | 123/467 |
| 4,920,942 | 5/1990 | Fujimori | 123/497 |
| 4,926,829 | 5/1990 | Tuckey | 123/497 |
| 5,018,500 | 5/1991 | Triold | 123/456 |
| 5,035,223 | 7/1991 | Watanabe | 123/514 |
| 5,044,344 | 9/1991 | Tuckey et al. | 123/497 |
| 5,070,849 | 12/1991 | Rich | 123/514 |
| 5,148,792 | 9/1992 | Tuckey | 123/497 |
| 5,265,644 | 11/1993 | Tuckey | 137/510 |
| 5,329,899 | 7/1994 | Sawert | 123/514 |
| 5,337,718 | 8/1994 | Tuckey | 123/497 |

*Primary Examiner*—Carl S. Miller
*Attorney, Agent, or Firm*—Barnes, Kisselle, Raisch, Choate, Whittemore & Hulbert

[57] ABSTRACT

A fuel pressure regulator for a no-return fuel system for an automotive engine with fuel injectors having a housing with a flexible diaphragm between first and second chambers. The second chamber has a fuel inlet receiving fuel from a fuel pump with a spring biased valve therein to admit fuel to the second chamber and an outlet to supply fuel to the engine. The second chamber is in continuous communication with the engine to accumulate any fuel expansion that may occur during engine deceleration or when the engine is turned off due to heating the fuel. The first chamber continuously communicates with the engine air intake manifold so that fuel is supplied to the engine fuel injectors at a substantially constant pressure drop across the injectors. An over-pressure relief by-pass valve responsive to pressure at said fuel inlet will by-pass fuel to a reservoir when pressure in said second chamber opens said spring biased valve. A switch in said by-pass valve acts through a pulse width modulator to reflect the over-pressure to the pump drive.

6 Claims, 2 Drawing Sheets

MANIFOLD REFERENCED RETURNLESS FUEL SYSTEM

This is a continuation-in-part U.S. application Ser. No. 08/181,848, filed Jan. 14, 1994, now pending, on a Demand Fuel Pressure Regulator.

FIELD OF THE INVENTION

This invention relates to pressure regulators and more particularly to an automotive fuel system in which a demand fuel pressure regulator is utilized.

BACKGROUND AND FEATURES OF THE INVENTION

In many engines with fuel injection systems, it is desirable to supply liquid fuel to the injector or injectors at a pressure which varies as a function of the manifold pressure so that the pressure drop across the injectors remains constant. The manifold pressure and the flow rate of fuel supplied by the injectors to the engine each vary with engine speed, load and other operating conditions.

Previous fuel supply systems have been developed, one of which is shown and described in U.S. Pat. No. 5,148,792. This system has a fuel tank with a fuel pump to supply fuel under pressure through a fuel line to a fuel rail coupled to a fuel injector for supplying fuel to the engine cylinder. The pump includes a pressure sensor which provides an electrical signal as a function of fuel pressure at the pump outlet to an electronic control to vary the speed of the pump to maintain a constant pressure within the fuel line. However, this system cannot maintain a constant pressure differential across the injectors.

Previous systems have been known to include a pressure regulator which has a manifold reference to maintain a constant pressure drop across the injectors. One such regulator is disclosed in U.S. Pat. No. 5,265,644. However, these prior regulators cannot accommodate any increase in pressure caused by fuel expansion due to heat rise and do not accumulate the increased volume of the heated fuel. For example, during engine deceleration the injectors may close trapping fuel in the fuel rail. The high temperature within the fuel rail causes the fuel to be heated and expand which increases the pressure in the fuel rail.

Pressure rise and fuel expansion in the rail also occurs during conditions known as hot soak. Hot soak conditions occur when the engine has been idling or running at slow speeds especially during hot weather or when the hot engine is turned off. The high temperature in the fuel rail plus the hot ambient air causes the fuel trapped in the fuel rail to be heated and expand. Some pressure increase is desirable to prevent fuel vapor formation. However, excessive pressure in the fuel rail is undesirable since it could force fuel through the injectors causing leakage and/or malfunctions.

In these by-pass type regulators, any fuel pressure above the set system pressure is relieved by returning fuel to the tank through a fuel return line. Accordingly, these devices maintain only a set system pressure. In addition the returning fuel may have an elevated temperature which may cause unwanted vaporization.

SUMMARY OF THE INVENTION

A demand regulator with a chamber referenced to the manifold can limit and regulate a desired pressure in the fuel rail during normal driving conditions. The demand regulator responds to manifold vacuum to maintain a constant pressure differential across the fuel injectors during normal and transient driving speeds, and also acts as an accumulator to accommodate expansion due to heating of fuel in the fuel rail, and also accommodates and maintains increased pressure of heated fuel in the fuel rail to prevent vapor formation during deceleration or engine shut-down when the injectors are not functioning.

In use, the demand regulator maintains, varies and limits the pressure in the fuel rail to provide a constant pressure drop across the injectors. This is accomplished by referencing the manifold pressure to a diaphragm chamber to cause the diaphragm to actuate the regulator valve to vary and limit the pressure of the fuel supplied to the rail.

A demand regulator is provided for use in a no-return fuel system to limit and regulate a desired pressure in the fuel rail during normal driving conditions, to respond to the manifold vacuum to maintain a constant pressure differential across the injectors during normal and transient driving speeds, to act as an accumulator to accommodate fuel expansion due to heating of fuel in the rail, and to accommodate and maintain increased pressure of heated fuel in the rail to prevent vapor formation therein.

To limit and regulate pressure in the fuel rail, the demand regulator of the present invention is preferably coupled to the fuel rail. Thus, a manifold reference is easily provided to the demand regulator in order to regulate the pressure in the fuel rail to maintain a constant pressure drop across the fuel injectors.

The demand regulator has a diaphragm received between a first gas chamber communicating with an engine intake manifold and a second liquid fuel chamber continuously communicating with a fuel rail of the engine. Liquid fuel is supplied at a constant pressure by a pump to the second chamber through a valve that opens and closes in response to movement of the diaphragm. In normal operation this supplies fuel to the rail at a pressure (such as 50 PSI) somewhat lower than the constant pressure (such as 55 PSI) of fuel supplied by the pump. If the fuel in the rail is heated and expands during deceleration or shut-down, the valve closes and the diaphragm is displaced to increase the volume of the second chamber and thereby accommodate expansion of the heated fuel.

Adjacent the outlet of the fuel pump, a one-way valve blocks fuel return to the pump and a by-pass pressure relief valve, set at higher than desired system pressure, is provided to by-pass fuel under excessive pressure, between the pump and the demand type pressure regulator back to a fuel reservoir.

Another embodiment connects the by-pass pressure relief valve with a built-in sensor switch which provides a signal to a pulse width modulator controlling the fuel pump when operating.

It is an object of the present invention to utilize the advantages of the demand fuel pressure regulator as above described and also to incorporate such a regulator in a fuel system with a manifold reference, but also to include a by-pass regulator near the fuel pump with a pressure sensor switch set at a pressure response higher than the desired system pressure.

It is a further object to provide a controlled bleed back valve which effectively traps fuel in the fuel rail to maintain an elevated pressure to prevent vaporization in the fuel rail and the injectors.

A still further object is the incorporation of a pressure by-pass regulator which utilizes a switching signal directed to a pulse width modulation circuit in conjunction with the fuel pump.

A still further object is the utilization of a pressure responsive by-pass valve which will function to maintain a substantially constant fuel pressure in the pump supply and which is set to a pressure slightly higher than that to be maintained by the demand regulator.

Objects, features and advantages of this invention are to provide a fuel pressure demand regulator for a no-return fuel system which maintains a constant fuel pressure drop across the injectors in response to varying normal engine operating conditions, accumulates heated expanded fuel in the fuel rail, decreases engine emissions, relieves excessive pressure of the heated expanded fuel, and i s rugged, durable, maintenance free, the system being of relatively simple design and economical manufacture and assembly, and having a long in service useful life.

BRIEF DESCRIPTION OF THE DRAWINGS

These and other objects, features, and advantages of this invention will be apparent in view of the following detailed description of the best mode, appended claims and accompanying drawings in which:

DETAILED DESCRIPTION OF THE INVENTION

Figure 1:
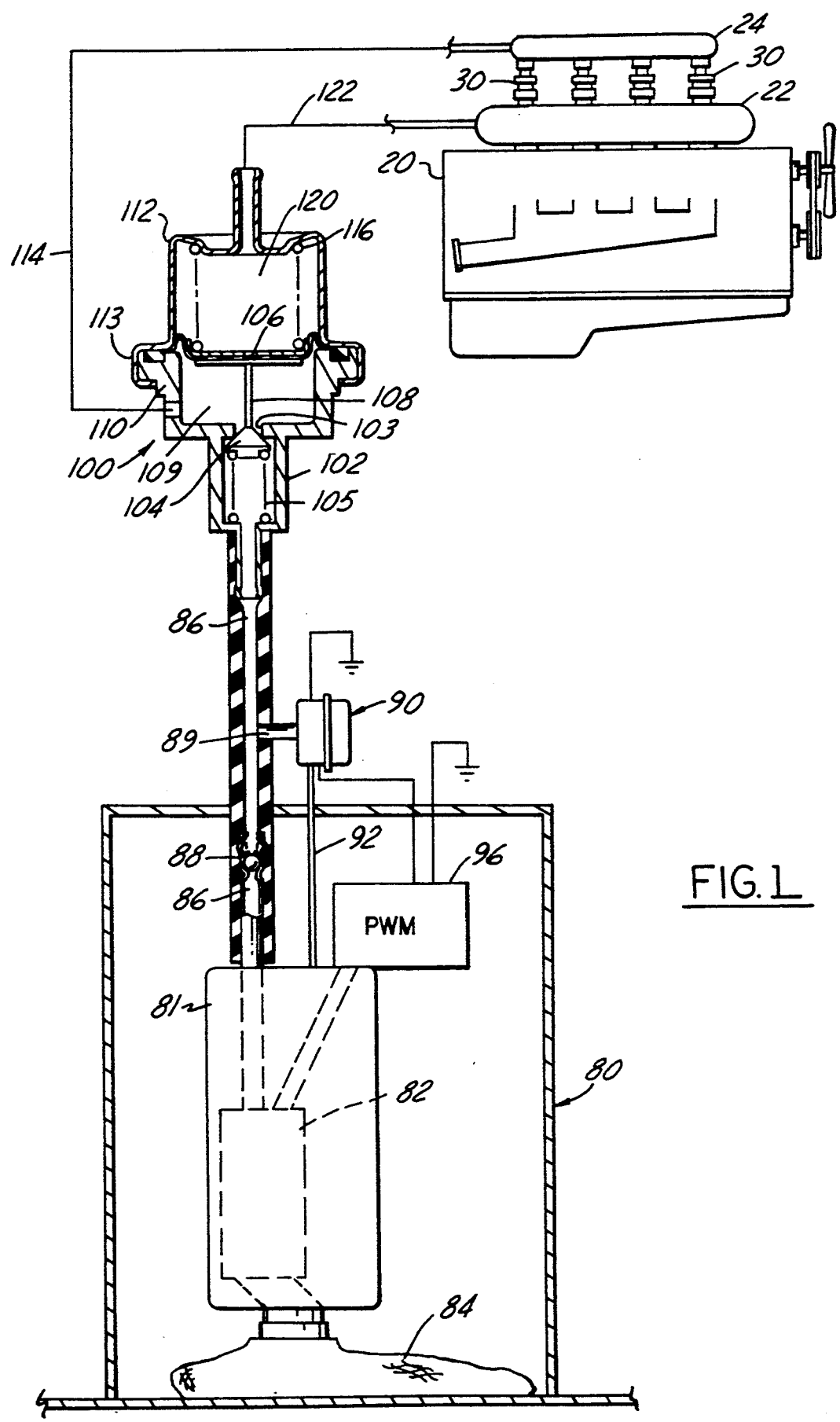
FIG. 1 is a schematic view of a vehicle engine with a demand fuel pressure regulator incorporating a one-way check valve, a by-pass regulator and a pump control.

With reference to the diagrammatic showing in FIG. 1, the engine 20 is shown with the air intake manifold 22, the fuel rail 24 and fuel injectors 30. At the base of the drawing, a fuel tank 80 houses a fuel reservoir 81 and a pump 82 with an inlet 84 and an outlet passage 86 and with an incorporated coaxial check valve 88 allowing pump outlet but preventing back flow. Above the check valve 88 is a side passage 89 leading to a by-pass regulator 90 which has an outlet passage 92 leading back to the reservoir 81.

The by-pass regulator 90 shown in FIG. 1 is a pressure control unit which is set 3 to 6 p.s.i. higher than the desired system pressure. The regulator 90 incorporates a pressure sensor switch which is in a circuit with a pulse width modulator 96 controlling the pump 82. A pump control of this nature is described in detail in U.S. Pat. No. 4,926,829 issued on May 22, 1990. A demand type pressure regulator 100, set for a desired pressure, is positioned at the end of the pump outlet 86 having an inlet section 102 with an inlet 103 containing a spring biased valve 104 connected to move in response to a diaphragm 106 through a shaft 108. A chamber 109 is formed below the diaphragm 106. The diaphragm has its periphery clamped between a lower valve housing 110 and an upper housing 112, this latter housing having a skirt 113 spun over a flange on lower housing 110.

The regulator 100 has a fuel outlet passage 114 connected to the fuel rail 24. The top housing 112 contains a compression spring 116 bearing against the diaphragm 106. The chamber 120 in the top housing 112 above the diaphragm is connected to (referenced to) the engine intake manifold 22 by passage 122.

Figure 2:
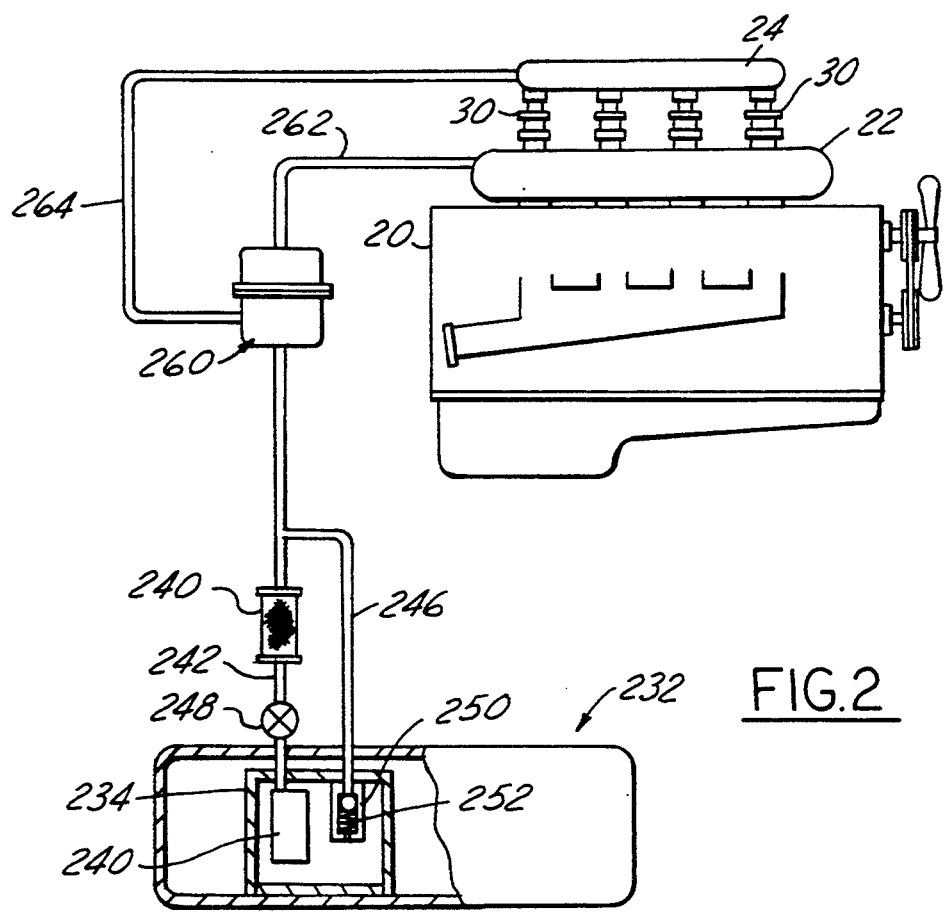
FIG. 2 is also a schematic view of a vehicle fuel system incorporating a demand fuel pressure regulator and a mechanical relief valve to maintain a substantially constant pressure in the fuel supply line.
Figure 3:
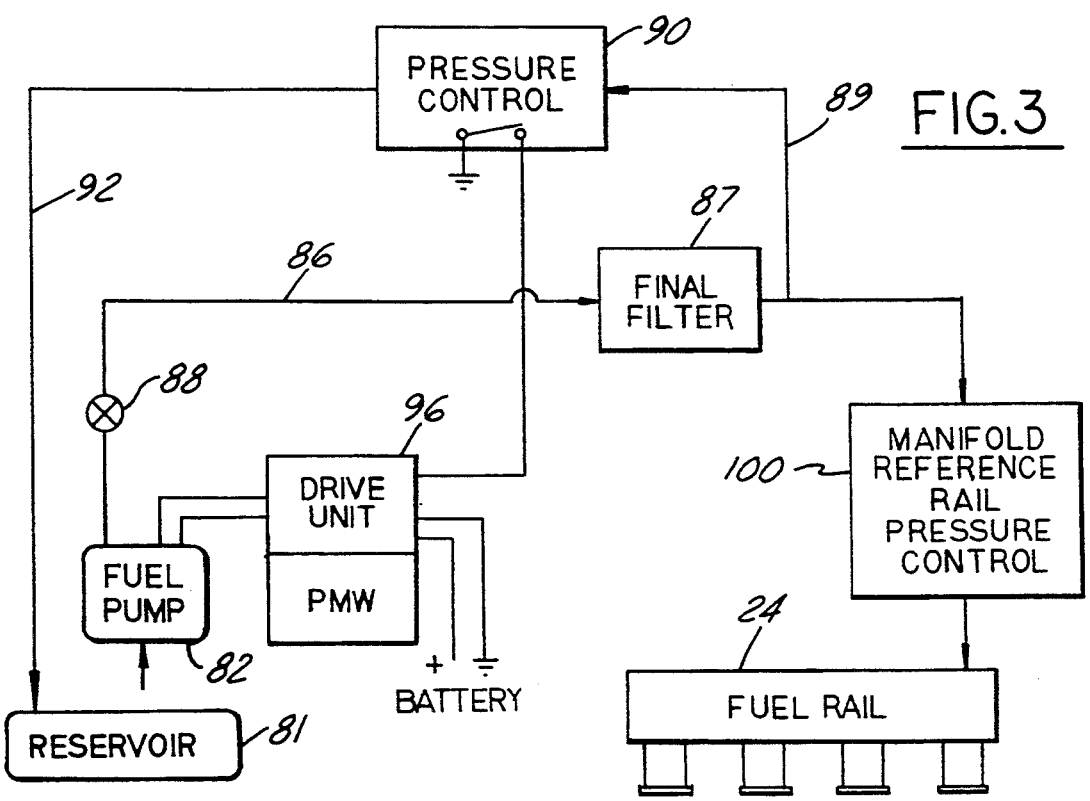
FIG. 3 is a schematic diagram showing block elements of the system illustrated in FIG. 1.

In FIG. 3, a block diagram illustrates the various elements of the system shown in FIG. 2. A fuel pump 82 delivers fuel through check valve 88 in line 86 to filter 87 and then to the manifold reference rail pressure control valve 100 which delivers the fuel to rail 24. A by-pass pressure control regulator 90 is connected to the pump outlet through conduit 89 and dumps fuel above a certain pressure through line 92 to the fuel reservoir 81. The switch in the regulator 90 is associated with the drive unit and pulse width modulator 96 which controls operation of the pump of the system.

Operation

With reference to FIG. 1, where the details of the demand regulator 100 are shown, the initiation of the pump operation will transmit fuel under pressure through check valve 88 in line 86 to valve 104 and to the chamber below diaphragm 106 when valve 104 is open. Fuel pressure in line 86 is transmitted to pressure control unit 90 which has a built-in pressure control switch and regulator combined. This valve 90 can by-pass fuel under high pressure to the reservoir 81 but the switch is in the circuit of the pulse width modulator 96 to influence the pump operation.

If the engine is operating under a steady state condition with a constant intake manifold pressure and a constant fuel flow rate to the rail, the opposing forces acting on the valve diaphragm 106 and valve 104 will be balanced with the valve in an open position. The net difference of the force produced by spring 116 and opposed by the fuel below the diaphragm 106 in chamber 109 and acting on the diaphragm is transmitted to the valve 104 through pin 108. The opposing forces acting on the valve are the force produced by the bias of spring 105 plus the force produced by the difference between the pressure of the fuel below the diaphragm 106 and the fuel supplied by the pump through passage 86. Because normal engine operation usually produces dynamic and varying conditions, not steady static conditions, the valve usually rapidly opens and closes or hunts to maintain a substantially constant differential pressure across the fuel injectors by varying the absolute pressure of the fuel supplied by the regulator to the fuel rail.

Under certain conditions, such as engine deceleration or hot soak, the valve 104 closes when diaphragm 106 rises with pin 108 and the fuel trapped in the rail 24 may be heated sufficiently to expand its volume. As the fuel expands, the diaphragm 106 and thus the pin 108 move away from the valve 104 and the pressure of the fuel trapped in the rail and the chamber 109 below the diaphragm increases. This accumulates the expanded fuel below the diaphragm 106, and the increased pressure retards and usually prevents the heated fuel from vaporizing. Movement of the diaphragm and hence expansion of the volume of the chamber 109 also decreases the extent to which the pressure increases and helps to prevent excessive pressure buildup. Such excessive pressure would cause the fuel in the rail to be forced through the injectors causing them to malfunction. If, due to heating, the pressure of the expanded fuel becomes excessive, it will cause the valve 104 to be forced open against the bias of the spring 105 to provide pressure relief by back bleeding fuel past the valve and to the passage 86 to thereby limit the maximum pressure buildup of the expanded fuel trapped in the rail and chamber 109. Once the pressure of the trapped fuel in the rail and chamber returns to the maximum value, the valve 104 again closes.

In the event of pressure back bleeding into passage 86, the by-pass regulator valve 90 will function. This valve is set 3 to 6 pounds per square inch, for example, above the desired system pressure. When pressure in pump outlet passage 86 reaches a certain point, the by-pass switch valve 90 will by-pass fuel to the reservoir. When the engine and the pump are operating and this excessive pressure develops, the switch in the valve 90 will act through the pulse width modulator 96 to modulate the pump speed.

In FIG. 2, a diagrammatic illustration of an engine 20 shows an air intake manifold 22 and a fuel rail 24 carrying fuel injectors 30. At the base of the drawing is a main fuel tank 232 with an included fuel reservoir 234 containing a pump 240 having an outlet passage 242. The pump has a conventional inlet in the reservoir 234 and a filter 244 is incorporated in the pump outlet passage 244. Just above the filter 244, a return passage 246 leads back to the reservoir 234. A check valve 248 is positioned between the pump 240 and the filter 244 to allow pump flow out but to block back flow to the pump. A pressure relief valve 250 is disposed at the end of the return passage in the reservoir. This valve has a backing spring 252 and is set 3 to 6 pounds per square inch higher than the set pressure of the demand fuel pressure regulator 260 positioned adjacent the engine 20 and shown diagrammatically in FIG. 1.

This regulator 260 is described in detail in the above referenced copending application Ser. No. 08/181,848 filed Jan. 14, 1994 and is also shown in FIG. 1. The regulator is referenced to the air intake manifold 22 by a passage 262, and has a fuel outlet passage 264 leading to the fuel rail 24.

In the operation of this embodiment of FIG. 2, fuel from the pump 240 will pass the check valve 248 and the filter 244 and reach the demand fuel pressure regulator 260 which will be set at a desired pressure such as 50 pounds per square inch.

With reference to FIG. 2, initiation of the pump operation 240 delivers fuel through line 242, check valve 248, and filter 244 to the manifold reference fuel rail pressure control valve 260 which is shown in detail at 100 in FIG. 1. A passage 246 from line 242 above filter 244 can deliver pump outlet pressure to a pressure control valve 250 in reservoir 234. The relief valve 250 has a spring 252 set 3 to 6 pounds per square inch above the demand fuel pressure regulator 260. Fuel from pump 240 reaches the regulator 260 and, while exerting operating pressure on the diaphragm, passes through line 264 to the fuel rail 24. The spring biased diaphragm in valve 260 is subject to pressure (referenced pressure) in the engine manifold 22 through line 262.

In use, the demand regulator 260 maintains, varies and limits the pressure in the fuel rail 24 to provide a constant pressure drop across the injectors 30. This is accomplished by applying the manifold pressure to the diaphragm in valve 260 through line 262 to activate the valve to vary and limit the pressure of the fuel supplied to the fuel rail.

While the demand regulator 260 will maintain a fairly steady pressure in the injectors and will accumulate fuel in the chamber below the diaphragm (as in FIG. 1), if pressure increases unduly due to hot soak or engine deceleration, this will exert pressure on valve 250 and cause by-pass flow into the reservoir 234.

In the event of pressure back bleeding into passage 242, the by-pass pressure relief valve 250 will function. This valve 250 is set 3 to 6 p.s.i., for example, above the desired system pressure. When pressure in pump outlet passage 242 reaches a certain point, the pressure relief valve 250 will bypass fuel to the reservoir.

What is claimed is:

1. A fuel pressure regulator combination for a no-return fuel delivery system for an internal combustion engine (20) with an air intake manifold (22) and at least one fuel injector (30), the regulator comprising: a housing (100,102), a flexible diaphragm 106 defining in cooperation with the housing first and second chambers, said diaphragm having generally opposed faces with one of the faces communicating with only the first chamber and the other face communicating with only the second chamber, one of the chambers 120 having a passage (122) for continuously communicating with an air intake manifold (22) of an engine, the other chamber 109 having an inlet (103) for supplying fuel to said other chamber and an outlet (144) for continuously communicating with at least one fuel injector of the engine 20 for supplying fuel thereto, a first valve (104) associated with said inlet (103) and movable to open and closed positions to control the flow of fuel through said inlet (103) and into said other chamber (109), an actuator pin (108) carried by one of said diaphragm and said valve for movement therewith for opening and closing said valve, a first spring (116) yieldably biasing said diaphragm 106 toward said valve (104), so that under normal operating conditions, said diaphragm (106) actuates said valve (104) to maintain a substantially constant pressure drop across the said one or more injectors (30), and when said valve (104) closes and the volume of fuel trapped between the injectors and said valve expands, the diaphragm 106 moves away and disengages from said valve to accommodate the expansion of the fuel, a fuel pump having a pump outlet passage in communication with said inlet of said other chamber, and a by-pass passage in communication with said pump outlet passage wherein, when said first valve is open in response to overpressure in said other chamber, fuel from said pump will by-pass into said by-pass passage.

2. A pressure regulator combination as defined in claim 1 in which said fuel pump is located in a fuel reservoir and said by-pass passage is open to said reservoir.

3. A pressure regulator combination defined in claim 1 in which said first valve is biased by a second spring to a closed position, and said first valve opens against the bias of said second spring to connect said other chamber to said pump outlet and said by-pass passage when pressure in said other chamber reaches a predetermined level.

4. A pressure regulator combination as defined in claim 1 in which a second valve is positioned in said by-pass passage, said second valve being biased to a closed position by a spring set above the desired accumulator pressure in said regulator.

5. A pressure regulator combination as defined in claim 4 in which a pulse width modulator is included in the fuel pump drive circuit, and a switch in said circuit, associated with said second valve, is actuated when said second valve is opened to modulate the drive of said pump.

6. A pressure regulator combination as defined in claim 1 in which a one-way valve is located in said pump outlet passage upstream of said by-pass passage.

* * * * *

UNITED STATES PATENT AND TRADEMARK OFFICE
CERTIFICATE OF CORRECTION

PATENT NO. : 5,398,655
DATED : March 21, 1995
INVENTOR(S) : Charles H. Tuckey

It is certified that error appears in the above-identified patent and that said Letters Patent is hereby corrected as shown below:

Col. 6, Line 21, change "144" to "114".

Signed and Sealed this

Twentieth Day of June, 1995

Attest:

BRUCE LEHMAN

Attesting Officer

Commissioner of Patents and Trademarks